United States Patent [19]

Carlson

[11] 4,311,298
[45] Jan. 19, 1982

[54] LOW PROFILE TANK CAR BALL VALVE

[75] Inventor: Edwin S. Carlson, St. Charles, Mo.

[73] Assignee: ACF Industries, Incorporated, New York, N.Y.

[21] Appl. No.: 134,050

[22] Filed: Mar. 26, 1980

[51] Int. Cl.³ .......................... F16K 5/06; F16K 27/00
[52] U.S. Cl. ................................ 251/144; 251/315; 251/367
[58] Field of Search .............. 251/310, 315, 144, 339, 251/367

[56] References Cited

U.S. PATENT DOCUMENTS

| 1,570,637 | 1/1926 | Nordstrom | 251/144 X |
| 3,256,910 | 6/1966 | Cupp | 251/310 |
| 3,286,735 | 11/1966 | Yindrock | 251/144 X |
| 3,591,131 | 7/1971 | Carlson | 251/144 |
| 3,661,355 | 5/1972 | Rawstron | 251/144 |
| 4,167,374 | 9/1979 | Smith | 251/367 |
| 4,212,447 | 7/1980 | Behle | 251/144 |

Primary Examiner—William R. Cline
Attorney, Agent, or Firm—Henry W. Cummings

[57] ABSTRACT

In a railway tank car, a tank mounting flange is integrally connected to the tank bottom. The tank mounting flange includes an opening into which is inserted a ball valve housing. The ball valve housing includes an upper housing portion and a lower housing portion. Mechanical housing fasteners hold the upper housing portion in engagement with the lower housing portion. The lower housing portion has an outwardly extending housing flange portion which engages the tank mounting flange. Removable fasteners hold the housing flange portion in place in engagement with the mounting flange. A ball valve is located within both the lower housing portion and the upper housing portion. A pair of vertically extending seals seal the ball valve with respect to the tank when the ball valve is in closed position. The ball valve may be either bottom operated or top operated.

10 Claims, 5 Drawing Figures

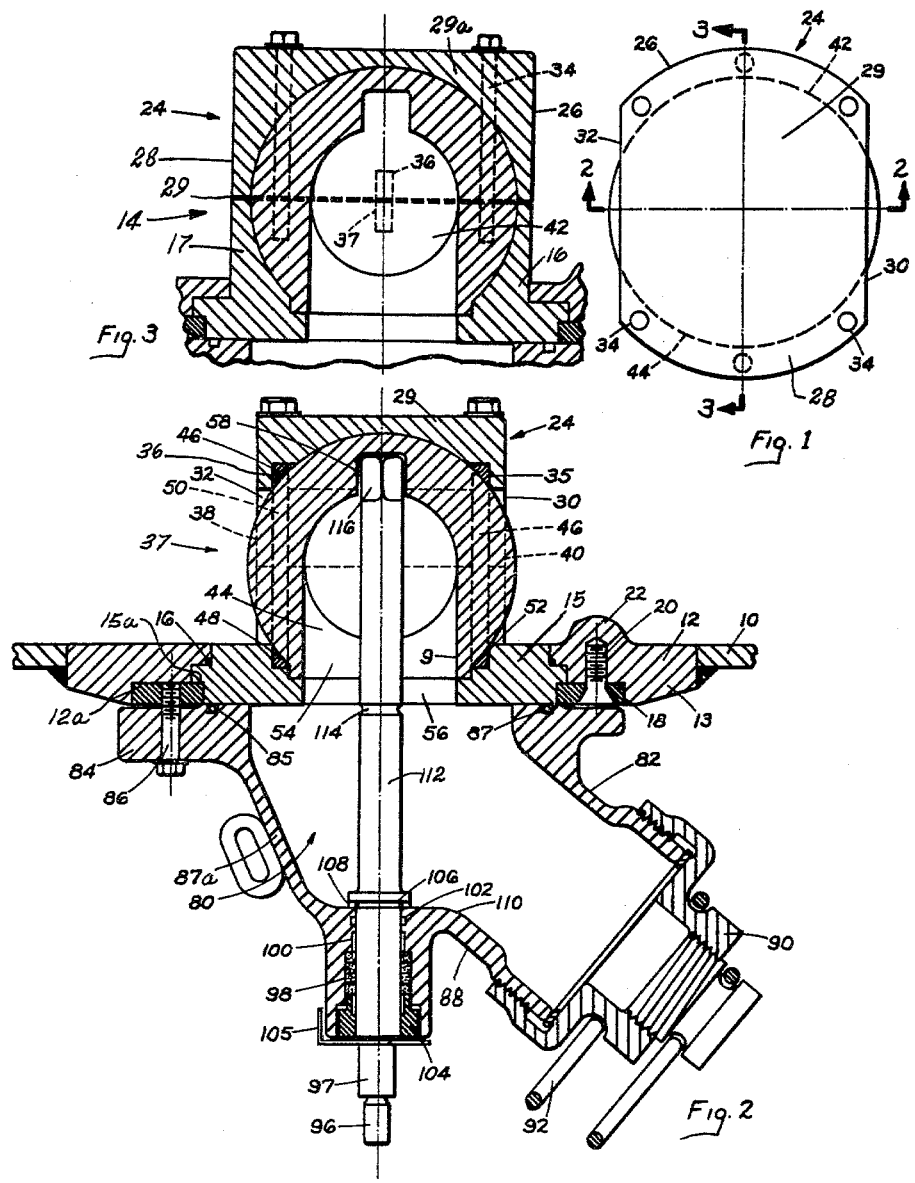

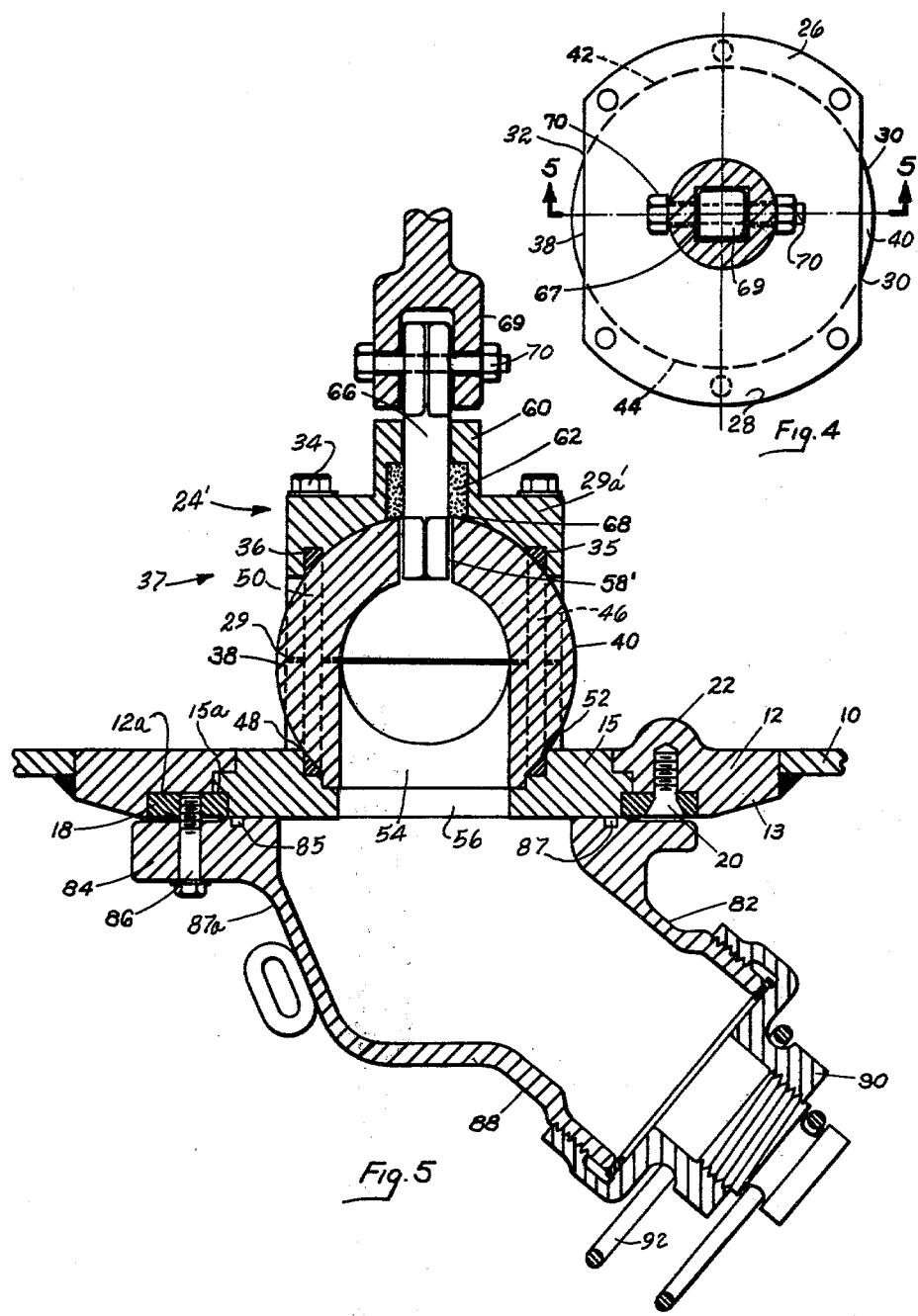

LOW PROFILE TANK CAR BALL VALVE

BACKGROUND OF THE INVENTION

U.S. Pat. No. 3,591,131 discloses a tank car bottom outlet valve comprising a ball valve operable from the bottom in which the discharge spout is laterally spaced from the depending ball valve operator. The housing for the ball valve is shaped such that lading can only enter the housing during unloading in one direction. In leaving the tank the lading must make a 90° turn. This results in slow unloading rates and cavitation of the housing. The unloading spout and depending operator are shearable in the event of impact to maintain the ball valve in seated position within the tank.

In U.S. Pat. No. 3,661,355 the discharge spout is aligned with the ball valve. However, the lading must move vertically up within the housing to enter the discharge valve. Thus all of the lading cannot be removed from the tank during unloading. The embodiment shown in FIG. 3 of this patent is similar to U.S. Pat. No. 3,591,131.

In U.S. Pat. Nos. 3,588,042 and 4,162,690 a ball valve is shown located in a horizontal transfer pipe which is operable from above the ball valve.

SUMMARY OF THE INVENTION

In a railway tank car, a tank mounting flange is integrally connected to the tank bottom. The tank mounting flange includes an opening into which is inserted a ball valve housing. The ball valve housing includes an upper housing portion and a lower housing portion. Mechanical housing fasteners hold the upper housing portion in engagement with the lower housing portion. The lower housing portion has an outwardly extending housing flange portion which engages the tank mounting flange. Removable fasteners hold the housing flange portion in place in engagement with the tank mounting flange. A ball valve is located within both the lower housing portion and the upper housing portion. Vertically extending sealing means seals the ball valve with respect to the tank when the ball valve is in closed position. The ball valve may be either bottom operated or top operated.

An outlet chamber is attached to the tank bottom mounting flange or to a retaining ring which supports the base, with shearable fasteners which shear upon impact to the outlet chamber. If the mounting flange extends more than one (1) inch below the lower surface of the tank bottom, the mounting flange is preferably tapered inwardly and downwardly toward the outlet chamber to comply with AAR and DOT regulations concerning projections extending below the tank bottom.

THE DRAWINGS

FIG. 1 is a plan view of the valve housing utilized in the present invention;

FIG. 2 is a vertical sectional view of the ball valve utilized in the present invention looking in the direction of the arrows along the lines 2—2 in FIG. 1;

FIG. 3 is a partial vertical sectional view of the present invention looking in the direction of the arrows along the line 3—3 in FIG. 1;

FIG. 4 is a plan view of a top operated embodiment of the present invention;

FIG. 5 is a vertical sectional view of the embodiment shown in FIG. 4 looking in the direction of the arrows along the line 5—5 in FIG. 4.

DESCRIPTION OF PREFERRED EMBODIMENTS

In accordance with the present invention, a tank bottom 10 includes an opening into which is welded a tank mounting flange 12 having a taper 13. A ball valve lower housing portion 14 includes a housing flange portion 15. Lower housing portion 14 also includes upwardly extending portions 16 and 17. Housing flange portion 15 includes a slot 15a and tank mounting flange 12 includes a slot 12a into which is inserted a retaining member 18. Fasteners 20 extend through the retaining member 18 and into the tank mounting flange 12. Additional material 22 is optionally provided to insure that the weight of the lading can be carried through this portion of the tank mounting flange.

An upper housing portion 24 includes upwardly extending portions 26 and 28. Lower housing portion 14 and upper housing portion 24 are split along a horizontal surface or plane 29. Upper housing portion 24 also includes a cover portion 29a. Open areas or ports 30 and 32 are defined between opposite sides of the housing as shown in FIG. 1. Vertically extending fasteners 34 (FIGS. 2 and 3) hold the upper housing portion 24 in engagement with the lower housing portion 14. Grooves 35 and 36 in upper housing portion 24 are adapted to receive seals which extend from the upper housing portion 24 into the lower housing portion 14 as indicated in FIG. 2.

A ball valve indicated generally at 37 includes a pair of semi-spherical ball portions 38 and 40 and a pair of openings or ports 42 and 44. In open position the ball valve ports 42 and 44 respectively align with the housing ports 30 and 32. In closed position, as shown in FIGS. 1 and 2, the semi-spherical portions of the ball valve 38 and 40 close the respective housing ports 30 and 32. Vertical spherical seals 46 and 50 are provided in split grooves 35 and 36 in the housing 34 and in grooves 48 and 52 located in lower housing portion 14, and encircle ports 30 and 32. In closed position the vertical seals 46 and 50 seal the interior of the tank with respect to the outside of the tank by closing off ports 30 and 32.

Each of the ball valve ports 42 and 44 are in communication with a ball valve bottom port 54. Ball valve bottom port 54 is in alignment with an opening 56 in lower housing portion 14 and is held concentric by the cylindrical portion 9. Thus when the ball valve is in open position, lading may flow through the housing ports 30 and 32 to the ball valve ports 42 and 44, into the bottom ball valve port 54 and out of the tank through opening 56, into and out of unloading chamber 82.

To rotate the ball valve between open and closed positions a non-round opening 58 is provided in the upper internal surface of the ball.

Ball valve 37 may be rotated from the bottom of the car by means of a vertically extending operator indicated generally at 80, located within an unloading chamber 82. Unloading chamber 82 includes a flange portion 84 through which shearable fasteners 86 are used to attach the unloading chamber to the retaining member 18. A groove 85 includes a seal 87. The unloading chamber further includes a hollow body portion 87a which communicates with an unloading spout 88. A threaded cap 90 closes the opening in the unloading spout. A chain 92 is attached to the cap to prevent loss thereof.

Operating assembly 80 includes a non-round connection portion 96. A round shaft portion 97 which extends through a packing gland 98, guides 100 and O-ring seal 102. This assembly is held in place with a threaded nut 104. Shaft portion 97 includes a shoulder 106 which rests on a thrust bearing 108, located upon the upper surface 110 of the body portion 87a. The center portion 112 of shaft 97 includes a shear groove 114 and a non-round connection portion 116 which engages non-round opening 58 in the ball valve. Rotation of shaft 97 rotates ball segment 36 to open or close valve. It will also rotate indicator 105 welded to shaft portion 97 to indicate if the valve is open or closed.

It will thus be apparent that when a suitable tool is connected to connection portion 96 of shaft 97, ball valve 36 may be rotated between open and closed positions.

To unload the lading the cap 90 is first removed from the spout 88 and a suitable discharge conduit, not shown, is attached to the spout 88. The ball valve is then moved to open position by means of a suitable operating tool from the bottom of the tank, connected to connection portion 96 of shaft 97. The lading then flows out through the housing ports 30 and 32, through ball ports 42 and 44 into the bottom port 54, out through opening 56 in lower housing portion 14 and into unloading chamber 82. The lading then flows out through spout 88 and into the discharge conduit. It is also to be noted that fasteners 86 are of a type which will shear if chamber 82 is impacted and operating assembly 80 is designed to drop out of opening 58 or shear at groove 114. A skid is not required to protect the outlet chamber 82. It also is to be noted that the mounting flange 12 is provided with a taper 13. This taper is of importance if the distance between the bottom of the mounting flange and the bottom of the tank bottom 10 exceeds one (1) inch. If this distance exceeds one (1) inch, the taper 13 is required by AAR and DOT regulations concerning projections below the tank bottom. If the distance between the bottom of the tank and the bottom of the mounting flange 12 does not exceed one (1) inch, the taper 13 may be dispensed with.

To rotate the ball valve from the top of the tank a guide 60 is provided in cover portion 29a including a packing gland 62 (FIGS. 4 and 5). A shaft 66 extends through an opening 68 in the upper housing portion 24′ and into the non-round opening 58′ to rotate the ball valve. The portion 67 of shaft 66 extending into the non-round opening is of a non-round configuration conforming to the non-round opening 58′ and of slightly smaller size.

A horizontal locating pin 70 is provided engaging shaft 66 to ensure engagement of the non-round shaft portion 67 with the non-round opening 58′ and to connect shaft 66 to operating rod 69 extending to the top of the tank. Shaft 66 may be then rotated from the top of the car in any known manner. Rotation of the ball valve by shaft 66 from the top moves the ball valve back and forth between open and closed positions. The lading flows out through ports 30, 32; 40, 42; opening 56 and spout 88 as described above. Operating assembly 80 is not necessary within the top operated embodiment. The assembly is otherwise the same as shown in FIGS. 1–3.

It will be apparent that the ball valve assembly of the present invention is advantageous over the construction shown in U.S. Pat. No. 3,591,131, referred to in the background, in that the lading may enter the ball valve housing by either of the ports 30 and 32 rather than from the single port shown in this patent. Furthermore, the ball valve ports 42 and 44 are in direct communication with a ball valve opening 54 which communicates directly with the outlet chamber. In contrast, in the arrangement shown in the '131 patent wherein the ball valve is laterally spaced from the discharge opening and a rather severe 90 degree bend is provided in the housing which all of the lading must flow through.

The construction is advantageous over the construction shown in U.S. Pat. No. 3,661,355 in that the lading need not flow upwardly above the ball valve to be discharged as shown in FIGS. 1 and 2 of this patent. Furthermore, the second opening in the housing of this patent for the operator is avoided in the embodiment of the present invention in which the ball valve of the present invention is operated from the bottom of the tank.

What is claimed is:

1. A bottom operable tank lading valve assembly comprising: a tank car mounting flange located within a tank opening in the tank bottom and connected to the tank bottom; a valve housing located within an opening in the mounting flange; said housing extending up into the tank body; said housing being split upon a horizontal plane into an upper housing portion and a lower housing portion; said lower housing portion having an outwardly extending flange portion which engages said mounting flange; means for removably connecting said lower housing flange portion to said tank car mounting flange whereby said housing may be removed from the bottom of the tank; housing fastening means extending between said upper housing portion and said lower housing portion; said housing having a pair of laterally spaced ports formed partially in said upper housing portion and partially in said lower housing portion to provide for lading flow into the housing; a ball valve rotatably mounted within said housing and extending into both said upper housing portion and said lower housing portion; said ball having a pair of side openings which in open position align with said housing ports; said ball having wall portions which in closed position close said housing ports and prevent lading from entering the housing; said ball valve side openings being in fluid communication with a bottom ball valve opening which aligns with a discharge opening in said lower housing portion; sealing means extending vertically in both said upper housing portion and said lower housing portion to seal said ball valve in closed position relative to said tank; a lower ball valve operator extending upwardly through said bottom ball valve opening; drive means connecting said lower operator to said ball valve whereby rotation of said operator will rotate said ball valve and move the same between open and closed positions so that in open position lading can flow through said housing ports, through said ball valve side openings and out of the tank through said bottom valve opening.

2. A bottom operable tank car valve assembly according to claim 1, wherein said lower housing portion and said upper housing portion are provided with laterally spaced vertically extending seals which engage the ball valve in closed position.

3. A bottom operable tank car valve assembly according to claim 2, wherein said upper housing portion and said lower housing portion are provided with aligned grooves to receive said laterally spaced seals.

4. A bottom operable tank car valve assembly according to claim 2, wherein said lower housing portion is provided with a housing slot and said mounting flange is provided with an adjacent mounting flange slot, and a retaining member is located in said housing slot and said mounting flange slot and removable fasteners extend through said retaining member and into said mounting flange to hold said lower housing member in place, whereby said ball valve housing including said ball valve can be removed from the bottom of the tank.

5. A bottom operable tank car valve assembly according to claim 4, wherein the tank bottom mounting flange is provided with extensions or knobs extending into the tank to provide sufficient material to carry the load of the lading acting on said lower housing portion.

6. A bottom operable tank lading valve assembly comprising: a tank car mounting flange located within a tank opening in the tank bottom and connected to the tank bottom; a valve housing located within an opening in the mounting flange; said housing extending up into the tank body; said housing being split upon a horizontal plane into an upper housing portion and a lower housing portion; said lower housing portion having an outwardly extending flange portion which engages said mounting flange; means for removably connecting said lower housing portion to said tank car mounting flange whereby said housing may be removed from the bottom of the tank; housing fastening means extending between said upper housing portion and said lower housing portion; said housing having a pair of laterally spaced ports formed partially in said upper housing portion and partially in said lower housing portion to provide for lading flow into the housing; a ball valve rotatably mounted within said housing and extending into both said upper housing portion and said lower housing portion; said ball having a pair of side openings which in open position align with said housing ports; said ball having wall portions which in closed position close said housing ports and prevent lading from entering the housing; said ball valve side openings being in fluid communication with a bottom ball valve opening which aligns with a discharge opening in said lower housing portion; sealing means extending vertically in both said upper housing portion and said lower housing portion to seal said ball valve in closed position relative to said tank; a top ball valve operator extending upwardly through said upper housing portion to the top of the tank; drive means connecting said top operator to said ball valve so that rotation of said top operator will rotate said ball valve and move the same between open and closed position; so that in open position lading can flow through said housing ports; through said ball valve side openings and out of the tank through said bottom valve opening.

7. A bottom operable tank car valve assembly according to claim 6, wherein said lower housing portion and said upper housing portion are provided with laterally spaced vertically extending seals which engage the ball valve in closed position.

8. A bottom operable tank car valve assembly according to claim 7, wherein said upper housing portion and said lower housing portion are provided with aligned grooves to receive said laterally spaced seals.

9. A bottom operable tank car valve assembly according to claim 6, wherein said lower housing portion is provided with a housing slot and said mounting flange is provided with an adjacent mounting flange slot, and a retaining member is located in said housing slot and said mounting flange slot and removable fasteners extend through said retaining member and into said mounting flange to hold said lower housing member in place, whereby said ball valve housing including said ball valve, can be removed from the bottom of the tank.

10. A bottom operable tank car valve assembly according to claim 9, wherein the tank bottom mounting flange is provided with extensions or knobs extending into the tank to provide sufficient material to carry the load of the lading acting on said lower housing portion.

* * * * *